Sept. 15, 1964 J. L. OLSON ETAL 3,148,720
LIVER SLICING MACHINE
Filed Dec. 21, 1962 2 Sheets-Sheet 1
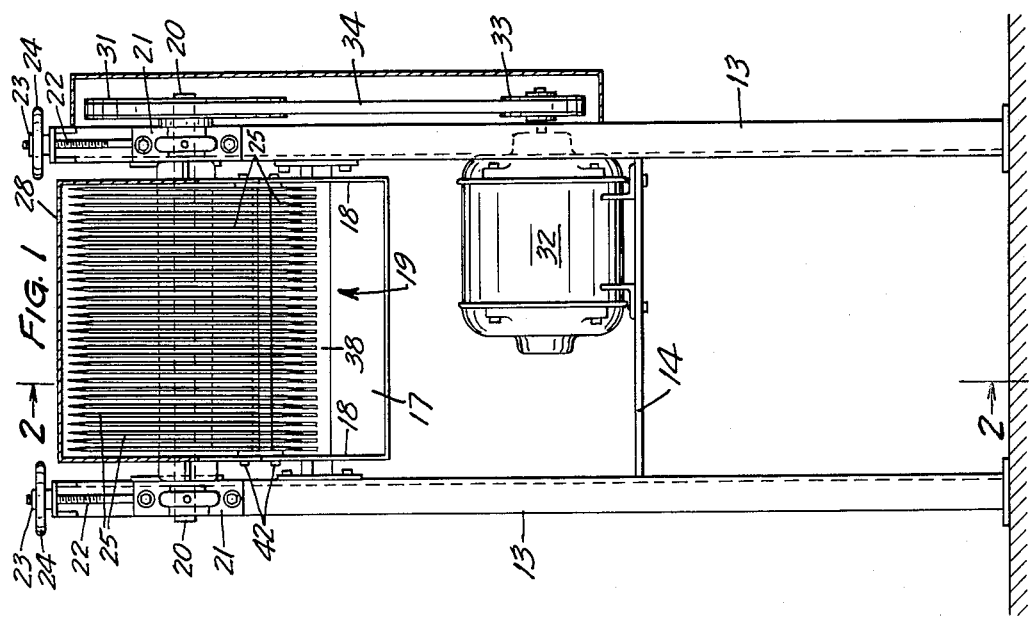
INVENTORS
JAMES L. OLSON
PALMER C. LUDVIGSEN
BY Williamson & Palmatier
ATTORNEYS Sept. 15, 1964   J. L. OLSON ETAL   3,148,720
LIVER SLICING MACHINE
Filed Dec. 21, 1962   2 Sheets-Sheet 2
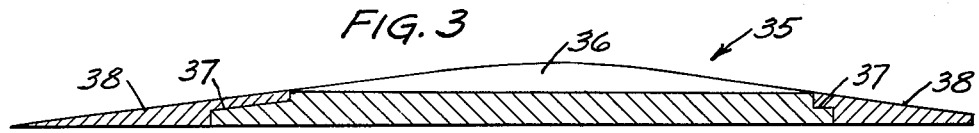
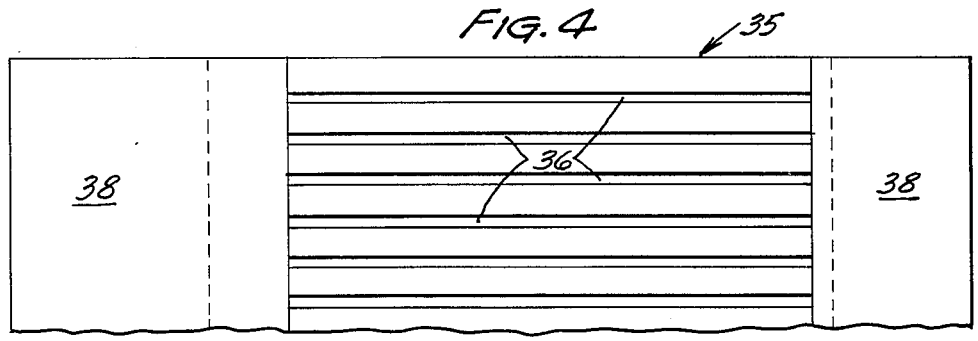
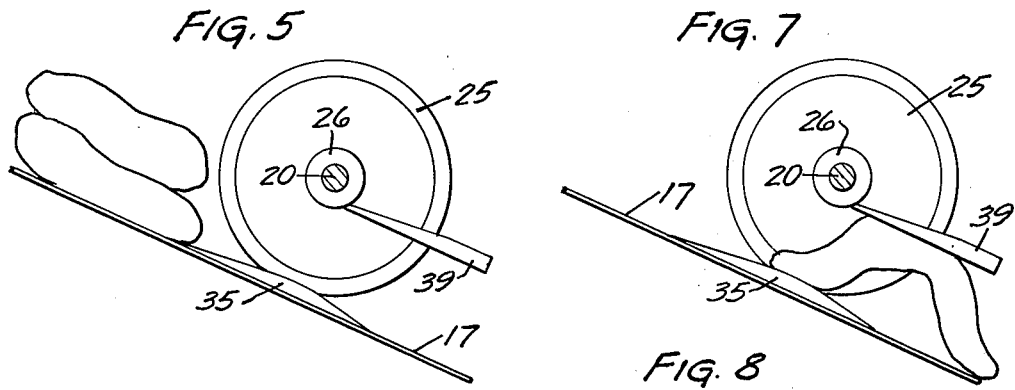
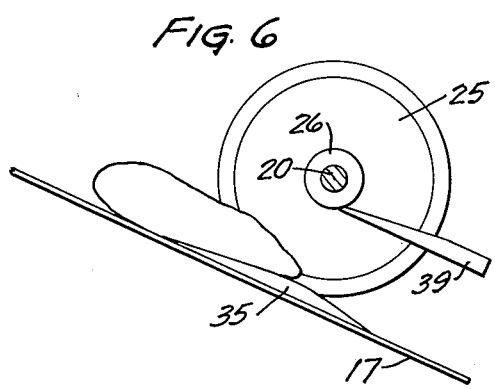
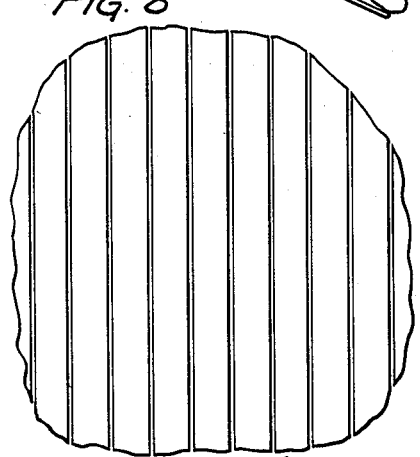
INVENTORS
JAMES L. OLSON
PALMER C. LUDVIGSEN
BY Williamson & Palmatier
ATTORNEYS

United States Patent Office 3,148,720
Patented Sept. 15, 1964

3,148,720
LIVER SLICING MACHINE
James L. Olson and Palmer C. Ludvigsen, Austin, Minn., assignors to Geo. A. Hormel & Company, Austin, Minn., a corporation of Delaware
Filed Dec. 21, 1962, Ser. No. 246,605
2 Claims. (Cl. 146—98)

This invention relates to a high capacity apparatus for very effectively cutting whole lobes of raw liver into slices of substantially uniform width.

Heretofore in many of the meat packing plants, pork and beef liver has not been sliced and packed in consumer receptacles or packages but has been sold in unsliced whole lobe form to the retail market where it is further processed by slicing and packing. The primary reason for not processing and packing beef and pork liver into packages or receptacles of sizes acceptable to ultimate consumers has been the extreme difficulty in handling and effectively slicing liver.

Because of the unique physical characteristics of liver, high capacity handling and cutting techniques used in most meat packing plants cannot be utilized in the processing and packing of liver. Whole lobes of liver which are purchased by the retail trade are ordinarily manually sliced for packing into consumer receptacles and this manual operation does not permit high capacity production.

With regard to the physical characteristics of liver, it will be appreciated that the liver cells are grouped into lobules separated by connective tissues and the entire liver lobe is covered by a peritoneum. The whole lobes of liver are not of symmetrical form and these irregularly shaped lobes are very difficult to handle and cut. However, because of the bulky size of uncut liver lobes, these lobes must be cut to slices or pieces capable of consumer use.

It is therefore an object of the present invention to provide a very high capacity apparatus for very effectively and economically cutting whole lobes of liver into slices of substantially uniform width to thereby permit ready packaging of these uniform slices into receptacles for ultimate sale to the consumer.

A further object of this invention is the provision of an apparatus of great commercial capacity for cutting raw liver into slices of substantially equal width and which may be utilized for a substantially continuous line of production in a packing plant and which preferably has a downwardly inclined support surface upon which whole lobes of raw moist liver are placed to be fed therealong by action of gravity into a multi-slice-forming rotary cutting medium, for cutting each whole lobe of liver simultaneously into a plurality of uniform slices and also, engaging and gripping each cut slice of liver along the cut surfaces thereof to impel the same through the cutting medium and thereafter releasing the cut slices of liver and positively directing the same for discharge from the apparatus.

These and other objects and advantages of our invention will more fully appear from the following description made in connection with the accompanying drawings wherein like character references refer to the same or similar parts throughout the several views, and in which:

FIG. 1 is a front elevational view of the apparatus of the instant invention with certain concealed portions thereof indicated by dotted line configuration;

FIG. 2 is a vertical sectional view taken approximately along line 2—2 of FIG. 1 and looking in the direction of the arrows;

FIG. 3 is a cross sectional view on an enlarged scale taken approximately through one of the slots of the guiding and compacting mechanism;

FIG. 4 is a top plan view of the guiding and compacting mechanism illustrated in FIG. 3;

FIGS. 5, 6, and 7 are diagrammatic side views similar to FIG. 2 illustrating step-by-step the slicing operation of the liver; and FIG. 8 is a diagrammatic top plan view illustrating the uniformity of width of the slices of liver which have been cut through the use of our novel process and apparatus.

Referring now to the drawings and more specifically to FIGS. 1 and 2 it will be seen that one embodiment of the liver slicing apparatus, designated generally by the reference numeral 10, is there shown. This liver slicing apparatus 10 includes an upstanding support frame 11 comprised of a pair of spaced-apart substantially parallel front leg elements 12 and a pair of spaced-apart substantially parallel rear leg elements 13. These leg elements are interconnected intermediate their respective ends by a motor support plate 14 as best seen in FIGS. 1 and 2. The rear leg elements 13 are also rigidly interconnected adjacent their respective upper ends by a rear cross frame element 15 and the front leg elements are interconnected intermediate their respective ends by a front cross frame element 16. It will be noted that the cross frame element 15 is disposed at a lower level than the cross frame element 16.

An inclined chute or support member 17 is rigidly mounted upon the cross frame members 15 and 16 and it will be seen that this support member 17 is of substantially flat rectangular configuration and is inclined forwardly and downwardly. The support member 17 has opposed upstanding side walls 18 rigidly affixed thereto throughout its length and it will be seen that the support member 17 projects beyond the front frame element 16. The support member 17 serves to convey whole lobes of raw liver therealong by action of gravity into a rotary cutting medium to permit cutting of the lobes into uniform slices. It will be seen that whole lobes of liver positioned upon the upper end portion of the support member 17 slide downwardly therealong to be cut by the rotary cutting medium or mechanism 19.

This rotary cutting mechanism 19 includes an elongate rotary shaft 20 positioned above and extending transversely of the support member 17. Opposite end portions of the shaft 20 are journaled for rotation in suitable bearings 21 each being secured to one of the front leg elements 13 for vertical shifting movement relative thereto. Each of the bearings 21 have retaining means such as bolts extending through the vertical slots formed in the front leg elements 13 to thereby permit vertical sliding movement of the bearings relative to its associated leg element.

Means are also provided for shifting the bearings 21 vertically relative to the front leg elements 13 and this means includes a pair of elongate upstanding actuating rods 22 each having its lower end fixedly connected to one of the bearings 21. The upper threaded end of each of the actuating rods 22 is threadedly engaged by an actuator nut 23 having a suitable annular handle 24 carried thereby. Revolving movement of the annular handle causes vertical shifting of the actuating rods 22 and thereby causes corresponding vertical shifting of the bearings 21.

A plurality of circular blades or knives 25 are secured to the shaft 20 for rotation therewith and the respective peripheral edges of these knives are beveled to define cutting edges thereat. The circular rotary cutting blades 25 are provided with central apertures therein to permit mounting of these blades upon the shaft 20 for rotation therewith and it is also pointed out that the knives or blades 25 are positioned upon the shaft 20 in spaced-apart relation with respect to each other. To this end, a plurality of annular spacing collars or washers 26 are provided and each is positioned in coaxial relation upon the shaft 20 between adjacent of the rotary cutting knives or blades 25. The blades 25 and the washers 26 are all provided with suitable key ways which are arranged in registering relation for the reception of a key 27, the latter being positioned within a key way in the shaft 20.

The rotary cutting mechanism 19 also includes an arcuate shield or housing 28 which is positioned in closely spaced concentric relation with respect to the upper circumferential portions of the knives or blades 25. The side walls 18 of the support 17 are each provided with a pair of upwardly opening vertical slots or socket-defining structures 30 positioned on opposite sides of the blades 25 and receiving in frictional engagement therein the stiffening or attachment strips 29, the latter being affixed to the respective front and rear edges of the arcuate shield 28.

Means are provided for revolving the rotary cutting circular rotary blades 25 and to this end it will be seen that one end of the rotary cutting shaft 20 projects beyond its associated bearing 21 and has mounted thereon for rotation therewith a relatively large driven pulley 31 as best seen in FIG. 2. A conventional electric motor 32 is mounted upon the motor support plate 14 by suitable securing means such as bolts or the like and the output shaft of the motor has a small drive pulley 33 keyed thereto for rotation therewith. An endless V-type drive belt is trained over the pulleys 31 and 33, respectively, and serves to transmit drive from the motor to the rotary drive shaft 20. Although the revolvable cutting blades 25 will be rotated at a predetermined speed, it is preferred that the electric motor be approximately of two horse power capacity and has an angular speed of 1160 r.p.m.

When liver to be cut is caused to be moved along the support 17 and into the revolving blades 25, it is preferred that the lobes of liver not only be positively guided into the revolving blades but also compacted somewhat in order to obtain the desired results. A compacting and guiding member 35 is therefore provided for compacting and guiding the liver and also serving as a guide for the revolvable blades 25. It will be seen that this compacting and guiding member 35 has an arcuate convex upper surface and a substantially flat lower surface as best seen in FIG. 3. The compacting and guiding member has a plurality of upwardly opening, longitudinally extending, substantially parallel grooves or slots 36 formed therein as best seen in FIG. 4. It is pointed out that the number of grooves 36 correspond to the number of rotary blades 25 and it will be noted from FIG. 2 that each blade 25 projects downwardly into one of these grooves 36. It is also pointed out that the spacing between adjacent blades 25 as well as between adjacent grooves 36 be substantially equal.

The respective front and rear edges of the compacting and guiding member 35 are recessed as at 37 to define a shoulder as best seen in FIG. 3. These recessed shoulder portions 37 are engaged in complementary abutting relation by front and rear clamping elements 38, the latter being secured to the upper surface of the support 17 by spot welding or the like in close proximity to the blades 25. It will be noted that the upper surfaces of the clamping elements 38 are arranged in substantially coextensive relation with respect to the upper surface of the compacting and guiding member 35 to thereby present a continuous arcuate convex surface over which the whole lobes of liver will travel, during the cutting operation.

Guiding and stripping means are also provided for engaging, stripping and guiding the slices of cut liver in a predetermined direction. This guiding and stripping means includes a plurality of elongate guiding and stripping elements 39 positioned in substantially side-by-side parallel relation and each having its innermost end beveled for engagement with one of the spacing collars 26. Each of these guiding and stripping elements has a vertically arranged attachment portion 40 at its forwardmost end which is provided with a pair of apertures 41 therein. Attachment rods 42 extend through the apertures 41 and have their opposite ends secured to the side walls 18 to thereby secure the guiding and stripping elements 39 in side-by-side substantially parallel relation. Suitable spacer elements are positioned between adjacent of the guiding and stripping elements 39 so that the spacing between adjacent of these elements will permit positioning of the same between adjacent of the rotary blades 25. Thus the cut slices of liver between adjacent blades will engage these guiding and stripping elements 39 and will be directed downwardly and forwardly for discharge from the inclined support 17.

In the operation of the apparatus above described, whole lobes of raw moist liver are cut during the multi-slicing process into slices of substantially uniform width. As pointed out above, one of the problems associated with slicing whole lobes of raw liver into pieces or slices acceptable for consumer usage has been the inability to carry out this cutting process to produce slices of substantially uniform size and at a high production rate. Even during manual cutting of liver, the cutting operation is difficult at best. This is attributable primarily to the physical characteristics of raw liver.

In both pork and beef liver, the respective liver cells thereof are grouped into lobules which are separated by connective tissue with accompanying blood vessels, nerves and bile ducts and wherein the whole is covered by a peritoneum which consists largely of fibrous connective tissue having an outer endothelial layer. The liver cells proper are isodiametric with a central nucleus and these cells are radially arranged in each lobule about a central blood vessel. A plurality of minute blood capularies and bile capularies run between the respective cells. Now it will be seen that while the individual liver cells are grouped into lobules, these cells are radially arranged with respect to these lobules. With this structural arrangement, there are no natural or regular structural planes defined in the whole lobes of liver such as those defined in striated muscle tissue. Therefore precise positioning, handling and cutting of the whole lobes of raw liver in a rapid high capacity process has not heretofore been developed so that very few, if any, of the packing house plants attempt to actually slice the whole lobes of liver into sizes acceptable for consumer sale. However, because of its high food value whole lobes of liver are sold to the retail trade where low capacity cutting processes are normally sufficient. Therefore these whole lobes of raw liver are normally cut manually by the retail food markets and butchers.

Through the use of our novel apparatus whole lobes of raw liver may be cut rapidly and into slices of substantially uniform width. During the operation of the liver slicing apparatus 10, the motor 32 will be energized to thereby rotate the shaft 20 in a counter-clockwise direction as viewed in FIGS. 2, 5, 6 and 7. These lobes of liver will then be thrown or otherwise placed on the uppermost end of the downwardly and forwardly inclined support 17 and will thereafter slide along the support by action of gravity towards the revolving blades 25. A plurality of such whole lobes of raw liver may be simultaneously fed upon the support since the apparatus is capable of operating at a continuous high capacity rate. As each whole lobe of raw liver is moved into engagement with the revolving blades 25, each lobe will be simultaneously cut at a plurality of spaced points therealong by the blades 25. A compacting action is also produced on the liver lobe by the guiding and compacting member 35 so that each lobe is not only progressively cut into slices of uniform width but each cut slice will be urged between adjacent blades so that the respective cut edges of the cut slice are gripped by the blades and pulled in the direction of the under passing arc of rotation of the blades. Thus it will be seen that the blades 25 not only serve to cut the liver, but also serve as a means for conveying the cut slices in the direction of the under passing arc of rotation, the latter also being in the downwardly and forwardly inclined direction of the support 17.

Because of the particular spacing of the respective rotary blades 25, each irregularly shaped whole lobe of liver will be cut into slices of substantially uniform width and each of these cut slices, as pointed out above will be impelled in a forwardly and downwardly inclined direction by adjacent of the rotary blades 25. The cut slices of liver will be carried by the adjacent blades until the forwardmost end of the cut slice engages one of the guiding and stripping elements 39, as best seen in FIG. 7, wherein the slice of cut liver will be engaged by this guiding and stripping element and will be positively guided and stripped from the associated rotary blades and will thereafter be discharged from the lower forward ends of the support 17.

Referring now to FIG. 8 it will be seen that the substantial uniformity of width of the cut slices are illustrated in the fragmentary top plan diagrammatic view thereof. The whole lobes of liver may be fed upon the rear elevated end of the inclined support 17 manually in batches or it may be continuously supplied thereto by any conventional material handling means such as a conveying system or the like. Suitable receptacles may be positioned for reception of the uniformly cut slices of liver discharged from the front lower end of the support 17 thereby permitting the process to be continuously or intermittently carried out.

The width of the slices cut will be determined by the spacing between adjacent blades 25 and this spacing will be set to produce those slices most acceptable for consumer sale. It will also be appreciated that by having the slices of liver of substantially uniform width, the subsequent packing operation will be facilitated. It is also pointed out that the entire cutter mechanism may be vertically shifted relative to the inclined support 17 and to the compacting and guiding member 35. It will therefore be seen that this guiding and compacting member 35 also serves as a gauge for the blades 25.

Thus it will be seen that whole lobes of raw moist liver will first be continuously fed upon the rear upper end of the inclined support 17 so that these lobes will be caused to slide downwardly by action of gravity into the revolving blades 25. The lobes will be compressed and guided by the compacting and guiding member 35 simultaneously during cutting of each whole lobe. As each whole lobe is cut into uniform slices, the slices will be impelled and pulled forwardly and downwardly by the blades 25 in their under passing arc of rotation and the cut slices will thereafter be engaged, stripped and guided from gripped relation between adjacent blades for discharge from the lower front end of the inclined support 17.

From the foregoing it will be seen that we have provided a high capacity apparatus for cutting whole lobes of raw liver into slices of substantially uniform width and which is especially adaptable for continuous line production in meat packing plants and the like.

It will also be seen from the preceding paragraphs that through the use of our apparatus, a great saving in both time and labor is effected. Thus it will be seen that we have provided an apparatus which is not only of simple and inexpensive construction and operation but our apparatus functions in a more efficient manner than any heretofore known comparable apparatus.

It will of course be understood that various changes may be made in the form, details, arrangement and proportions of the various parts without departing from the scope of our invention.

What is claimed is:
1. Apparatus for cutting whole lobes of raw liver into a plurality of slices of substantially uniform width, said apparatus comprising
   a substantially flat elongate downwardly inclined support adapted to receive whole lobes of raw untreated liver at its uppermost end and to direct the same by action of gravity towards the lower end thereof,
   rotary cutting mechanism including an elongate shaft positioned above and transversely of said inclined support intermediate the ends thereof,
   a plurality of similar, spaced-apart rotary blades arranged in side-by-side coaxial relation on said shaft for rotation therewith,
   spacer elements on said shaft disposed between adjacent blades and cooperating with the latter so that the spacing between adjacent blades is substantially equidistant,
   bearing means revolvably mounting opposite end portions of said shaft above said inclined support for revolving movement relative thereto, vertical adjusting members engaging said bearing means and being operable to vertically shift the same and bodily raise and lower said shaft relative to said support,
   actuator means connected to said adjusting members for actuating the same,
   a compacting and guiding member mounted on said support and being positioned substantially below the revolvable blades, said compacting and guiding member having an arcuate convex upper surface for guiding and compacting the lobes of liver into said revolvable blades, the latter cutting each lobe of liver at longitudinally spaced points therealong to thereby cut the lobes into a plurality of slices of substantially uniform width, said compacting and guiding member having a plurality of upwardly opening slots therein corresponding in number to the number of said revolvable blades and each slot receiving therein a peripheral portion of one of said blades, the underpassing arc of rotation of said blades being in the downwardly inclined direction whereby opposed cut surfaces of each slice are gripped between each adjacent pair of blades to be pulled by the latter in said downwardly inclined direction,
   a plurality of elongate stripping and guiding elements each having means at one end thereof connected with said support adjacent the lower end thereof, each of said stripping and guiding elements extending substantially radially inwardly between adjacent blades within their respective orbits of rotation thereof, the inner ends of each stripping and guiding element engaging the peripheral edge of the associated spacer element whereby said stripping and guiding elements engage each slice of cut liver to strip the same from gripped relation between each blade and to positively direct the cut slices downwards along said inclined support, and each of said striping and guiding elements being spaced above and in substantially parallel relation to said support a distance corresponding to substantially the radius of one of said blades.
2. The apparatus as defined in claim 1 wherein said actuator means threadedly engages said vertical adjusting members whereby upon relative movement between said actuator means and said vertical adjusting members the latter are translated vertically to shift the shaft mounted blades vertically.

References Cited in the file of this patent
UNITED STATES PATENTS

| | | |
|---|---|---|
| 2,241,648 | Spang | May 13, 1941 |
| 2,279,072 | Spang | Apr. 7, 1942 |
| 2,510,291 | McLauchlan | June 6, 1950 |